United States Patent [19]

Langner

[11] Patent Number: 5,269,565
[45] Date of Patent: Dec. 14, 1993

[54] PIPELINE BREAKAWAY PROTECTION MECHANISM

[75] Inventor: Carl G. Langner, Spring, Tex.
[73] Assignee: Shell Oil Company, Houston, Tex.
[21] Appl. No.: 825,731
[22] Filed: Jan. 27, 1992

Related U.S. Application Data

[63] Continuation of Ser. No. 589,365, Sep. 28, 1990, abandoned.

[51] Int. Cl.⁵ .............................................. F16L 57/00
[52] U.S. Cl. ................................... 285/2; 285/1; 248/548; 248/62; 29/426.4; 29/414
[58] Field of Search ............... 285/2, 1; 405/168, 169, 405/170, 172; 138/119; 248/548, 62, 58; 29/426.4, 413, 414

[56] References Cited

U.S. PATENT DOCUMENTS

| | | | |
|---|---|---|---|
| 2,439,067 | 4/1948 | Wood | 248/58 |
| 3,219,119 | 11/1965 | Matthews, Jr. | 405/169 |
| 3,498,374 | 3/1970 | Drouin | 285/2 |
| 3,744,505 | 7/1973 | Huvey et al. | 137/68 |
| 3,870,350 | 3/1975 | Loncaric | 285/286 |
| 3,955,599 | 5/1976 | Walker | 405/169 |
| 4,116,015 | 9/1978 | Duncan | 405/169 |
| 4,295,484 | 10/1981 | Meisenheimer, Jr. | 285/2 |
| 4,301,989 | 11/1981 | Kallenbach | 248/548 |
| 4,351,351 | 9/1982 | Flory et al. | 285/2 |
| 4,617,975 | 10/1986 | Rabushka et al. | 285/2 |

Primary Examiner—Randolph A. Reese
Assistant Examiner—Timothy Aberle

[57] ABSTRACT

A pipeline breakaway mechanism is provided which includes an elbow in a pipeline and two clamps holding the pipeline to a structure such as a platform or another pipeline. When a strong pull is exerted on the pipeline, the pipeline is bent until it buckles around the first clamp; the first clamp then fails at a preset load, causing the pipe to bend around the second clamp and causing the previously formed buckle to straighten. This buckling and straightening of pipe causes the pipe wall to fracture at a load much smaller than its tensile strength.

3 Claims, 2 Drawing Sheets

PIPELINE BREAKAWAY PROTECTION MECHANISM

This is a continuation of application Ser. No. 589,365 filed Sep. 28, 1990 now abandoned.

BACKGROUND OF THE INVENTION

1. Field of the Invention

The present invention pertains to improvements in breakaway mechanisms designed to protect a pipeline tie-in to an offshore platform, or an existing pipeline, or a subsea structure such as a wellhead, by installing a weak link commonly known as a breakaway device, in a new pipeline.

2. Description of Prior Art

Breakaway protection for offshore structures is primarily required against soil movements or mud slides which can subject a pipeline to extremely large tension loads. Breakaway protection is also often used against seismic loads and against anchor hooking loads for tie-ins which may be severely damaged by such loads, especially in areas where there are frequent seismic events and in other areas where there is considerable floating construction activity or floating drilling activity nearby. In addition to breakaway protection, there is often a need for a certain elastic flexibility in a pipeline system which can absorb small movements of the pipeline due to thermal expansion or trawl gear impacts, without damaging or shutting down the pipeline.

The art provides various commercial safety joints and pipeline couplings, which are designed to pull apart at a specified load, independently of the pipeline pressure, temperature, or applied bending moments. These devices depend upon mechanical pistons, seals, and breaking mechanisms for operation, and are often installed in tandem with a check valve to minimize loss of internal fluid in the event of a break. The breakaway load for a commercial safety joint normally is chosen to be sufficiently high to prevent inadvertent breaking, but yet low enough to be safely below that which would damage the platform, pipeline, or a subsea structure. Thus, for a J-tube riser on to a fixed platform, the breakaway load normally is set between 400 and 800 kips, since the platform structure can safely withstand such loads, whereas, for a tie-in to an existing pipeline or a subsea wellhead, the selected breakaway load would have to be considerably less.

Experience with these joints has occasionally resulted in inadvertent safety joint failures, at tension loads well below their design loads, and has called into question the reliability of the commercial safety joint. Each failure required an expensive repair involving costly offshore equipment and divers. While there is no evidence to indicate that a mechanical safety joint will not function as designed once properly installed, the overall cost of such devices may become prohibitive if the incidence of premature failures were to become more frequent.

Accordingly, the present invention is directed to overcoming the above-noted problems in the art and to providing a solution as more particularly described hereinafter.

SUMMARY OF THE INVENTION

The primary purpose of the present invention is to provide a pipeline breakaway protection mechanism and method for the use thereof.

The purpose of the invention is achieved through a method for protecting an offshore structure from a tension load in a pipeline connecting to the structure, the tension load being greater than a predetermined magnitude, comprising bending the pipeline with the tension load to form a buckle; and straightening the buckle with the tension load, thereby causing the pipeline to fracture and break at the location of the straightened buckle. Preferably, the pipeline is connected at first and second locations to the structure, the pipeline buckling at the first location and then straightening as means connecting the pipeline at the first location breaks at the load of predetermined magnitude. The pipeline may be angled at a third location adjacent to the first location and opposite to the second location in the structure, so that the angle is straightened as the pipeline is buckled. In a specific embodiment, the pipeline is connected at the first and second locations to the structure by respective pipe clamps and standoffs, and the standoff at the first location is designed to break at the load of predetermined magnitude. More specifically, the structure may be an offshore platform, the pipeline comprising a riser, and the angle comprising a riser bend connecting the riser to the remainder of the pipeline. Alternatively, the structure may be a second pipeline and the angle may be an elbow in the first pipeline.

DESCRIPTION OF PREFERRED EMBODIMENTS

The following preferred embodiments of the invention, together with the following examples, explain the principles of the invention.

When a pipeline is bent monotonically to buckling, the pipe wall usually remains intact and the pipe retains nearly its full tensile strength. However, if that same pipe is buckled and then straightened, fractures develop in the pipe wall and the tensile strength of the pipe is reduced to approximately 10 to 20 percent of its original ultimate strength. This basic mechanism, wherein a pipe is buckled and then straightened, is used in accordance with the present invention to deliberately introduce a weak link (known hereinafter as a breakaway mechanism) into the pipeline to protect some structure such as an offshore platform, another pipeline, a subsea wellhead, subsea riser base, etc., to which the first pipeline may be attached.

Thus, in accordance with the present invention, a basic pipeline breakaway mechanism is provided which comprises at least one angle, such as a 90 degree turn, in a pipeline and preferably at least two clamps holding the pipeline onto the structure. When a strong pull is exerted on the pipeline, as by a mud slide or by anchor hooking, etc., the pipeline is bent until it buckles around the first clamp; the first clamp then fails at a certain preset load; then the pipe bends around the second clamp as the previously buckled pipe straightens. Finally, the straightening (reverse bending) of the buckled pipe causes the pipe wall to fracture and break as described hereinafter. Accordingly, the present invention provides a two-part process (buckling following by straightening) which is essential for weakening the pipeline.

Having thus generally described the apparatus and method of the present invention, the following is a more detailed description thereof.

Figure 1:
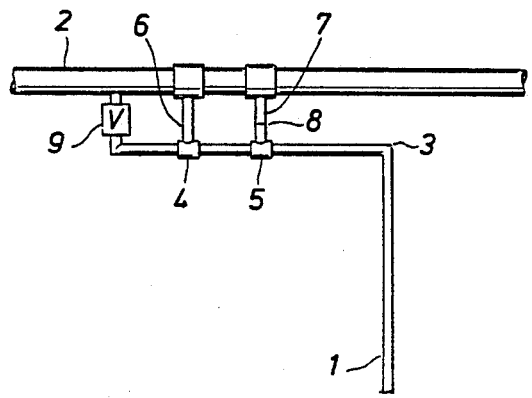
FIGS. 1-4 show a breakaway sequence where a new pipeline is connected to an existing pipeline.
Figure 2:
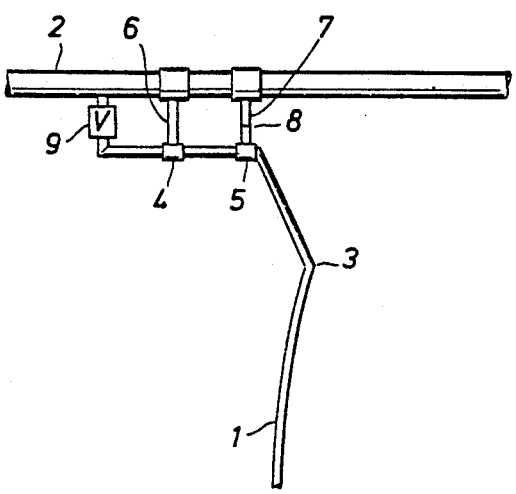
Figure 3:
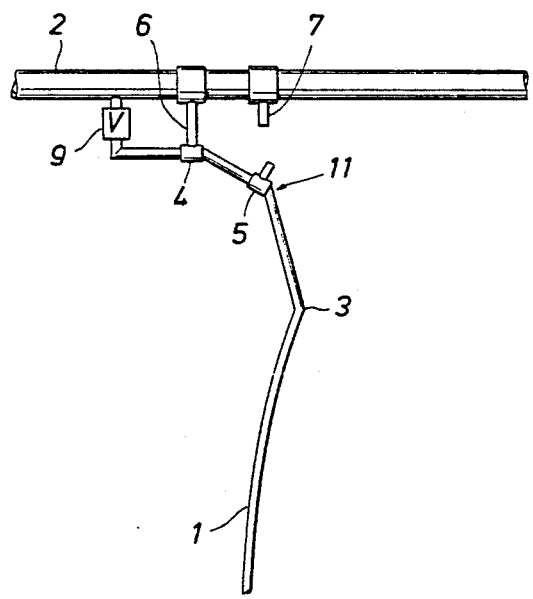
Figure 4:
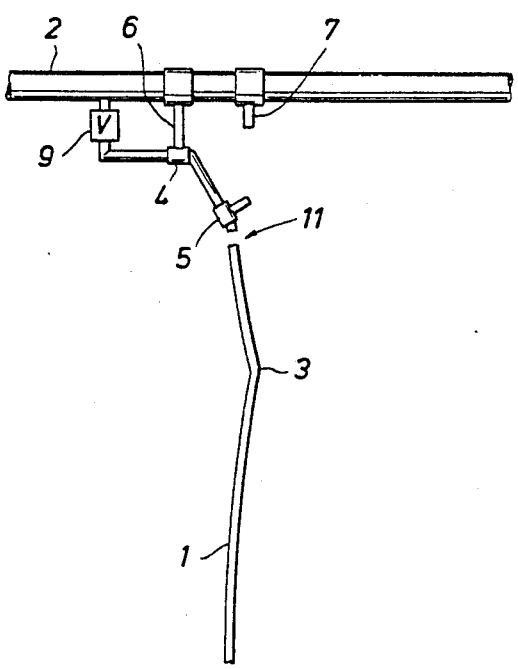
Figure 5:
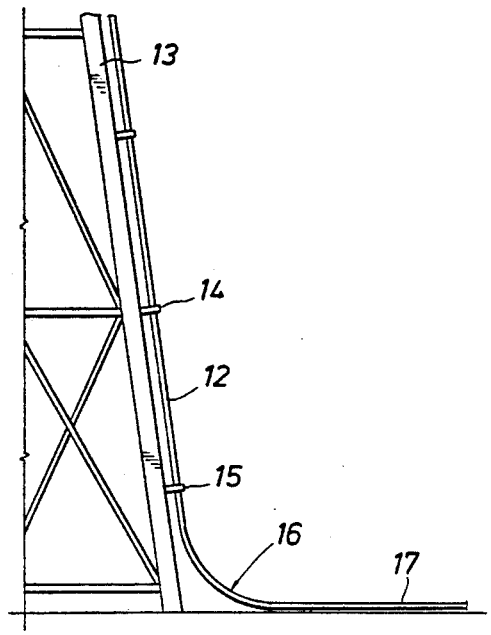
FIGS. 5-8 show a breakaway sequence where a pipeline is connected by a riser to an offshore platform.

FIGS. 1-4 show a breakaway sequence wherein a new pipeline is connected to an existing pipeline. New pipeline 1 is connected to existing pipeline 2 via a bend in the pipe such as an elbow 3 which may be, for example, a 90 degree elbow, which in turn is connected to the existing pipeline 2 by means of pipe clamps 4 and 5 and standoffs 6 and 7, of which standoff 7 includes a breakaway link 8 therewithin. New pipeline 1 is connected into the existing pipeline 2 by means of a hot tap ball valve 9. In FIG. 2 the first step of the sequence is shown wherein a strong pull is exerted on the pipeline, caused, for example, by a mud slide, in the direction of arrow 10. This causes elbow 3 to be straightened and pipeline 1 to buckle around pipe clamp 5, the first clamp. In FIG. 3 the second step of the sequence is shown wherein the elbow 3 is substantially straightened out and the buckle 11 is subjected to reverse bending. At the same time, the first standoff 7 breaks at a preset load at the breakaway link 8, and the pipe simultaneously buckles around the second clamp 4. In the final step of the sequence, the previously buckled pipe I fractures when straightened at the first buckle 11 and parts, thereby leaving the pipeline 2 without any damage.

Figure 6:
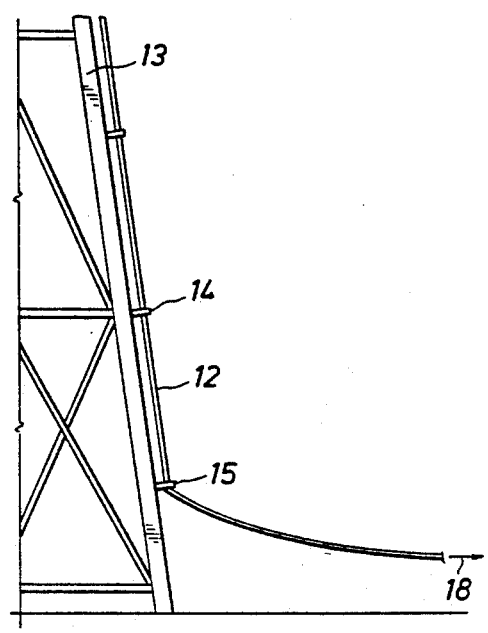
Figure 7:
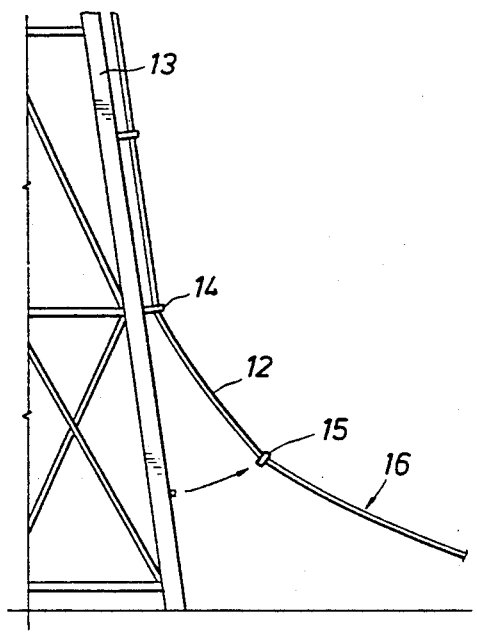
Figure 8:
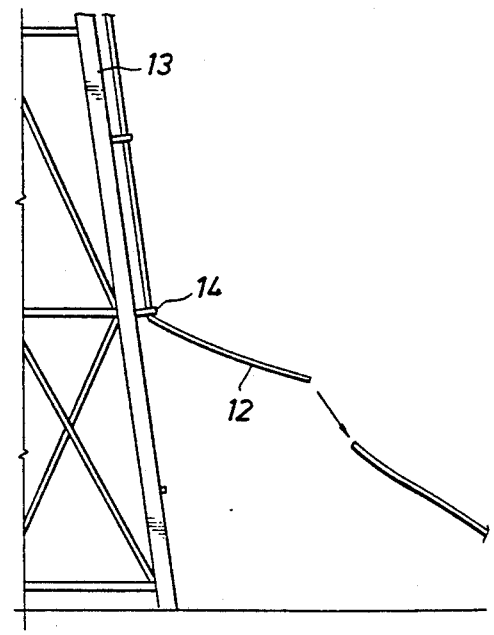

A second breakaway sequence is shown in FIGS. 5-8. In this embodiment a riser 12 is connected to an offshore platform 13 by means of riser clamps 14 and 15. A riser bend 16 connects the riser 12 to a pipeline 17 extending away from the platform. In FIG. 6 the first step of a sequence of steps is shown wherein the pipeline 17 buckles around the first riser clamp 15 as a strong pull is exerted on the pipeline by, for example, a mud slide, etc. in the direction of arrow 18. In FIG. 7 the second step of the sequence is shown in which the pipe buckles around the second riser clamp 14 as the riser bend 16 becomes substantially straightened, and the first riser clamp 15 parts as forces continue to be exerted in the direction of arrow 18. In the final step of the sequence shown in FIG. 8 the buckled pipe fractures at the location of the first buckle as the pipe is straightened and no damage is done to the platform 13.

The foregoing description of the invention is merely intended to be explanatory thereof, and various changes in the details of the described methods and apparatus may be made within the scope of the appended claims without departing from the spirit of the invention.

What is claimed is:

1. A method for protecting an offshore structure from a tension load in a pipeline connecting to said structure, said tension load being greater than a predetermined magnitude, comprising:

arranging a portion of said pipeline adjacent to said offshore structure to extend at an angle to the remainder of said pipeline extending away from said offshore structure;

attaching said portion of the pipeline to the offshore structure with a breakaway means functional to part from the offshore structure at a load less than said tension load; and applying tension to the pipeline extending away from the offshore structure, said tension being sufficient to first cause the pipeline to bend and buckle at a location adjacent to the breakaway means, then cause said breakaway means to part from the offshore structure, then cause the buckle to at least partially straighten out and thereby weaken the pipeline at the location of the at least partially straightened-out buckle, and finally cause the pipeline to part at said weakened location.

2. The method of claim 1 wherein the offshore structure is another pipeline.

3. The method of claim 1 wherein the offshore structure is an off shore platform and the pipeline is a riser attached to the offshore structure.

* * * * *